United States Patent
Zuk et al.

(10) Patent No.: US 8,009,566 B2
(45) Date of Patent: Aug. 30, 2011

(54) PACKET CLASSIFICATION IN A NETWORK SECURITY DEVICE

(75) Inventors: Nir Zuk, Palo Alto, CA (US); Song Wang, Palo Alto, CA (US); Siu-Wang Leung, Fremont, CA (US); Fengmin Gong, Livermore, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 560 days.

(21) Appl. No.: 11/475,393

(22) Filed: Jun. 26, 2006

(65) Prior Publication Data

US 2007/0297333 A1 Dec. 27, 2007

(51) Int. Cl.
*G06F 15/16* (2006.01)

(52) U.S. Cl. .......................... 370/235; 370/230

(58) Field of Classification Search .............. 370/351, 370/229, 389, 315; 709/219, 206; 711/122; 726/23, 22; 713/201; 395/500
See application file for complete search history.

(56) References Cited

U.S. PATENT DOCUMENTS

| | | | |
|---|---|---|---|
| 5,440,719 A * | 8/1995 | Hanes et al. ............... | 703/21 |
| 6,147,993 A | 11/2000 | Kloth et al. | |
| 6,553,028 B1 | 4/2003 | Tang et al. | |
| 6,728,885 B1 | 4/2004 | Taylor et al. | |
| 6,912,592 B2 | 6/2005 | Yip | |
| 7,089,294 B1 * | 8/2006 | Baskey et al. ............. | 709/219 |
| 7,155,572 B2 * | 12/2006 | Hughes et al. ............. | 711/122 |
| 7,486,673 B2 | 2/2009 | Harijono et al. | |
| 2001/0027526 A1 * | 10/2001 | English et al. ............. | 713/201 |
| 2002/0026482 A1 * | 2/2002 | Morishige et al. ......... | 709/206 |
| 2004/0105440 A1 | 6/2004 | Strachan et al. | |
| 2005/0044422 A1 * | 2/2005 | Cantrell et al. ............ | 713/201 |
| 2005/0050171 A1 * | 3/2005 | Deerman et al. ........... | 709/219 |
| 2005/0182950 A1 | 8/2005 | Son et al. | |
| 2005/0190694 A1 * | 9/2005 | Ben-Nun et al. ........... | 370/229 |
| 2005/0216770 A1 | 9/2005 | Rowett et al. | |
| 2005/0257263 A1 * | 11/2005 | Keohane et al. ........... | 726/22 |
| 2006/0056297 A1 | 3/2006 | Bryson et al. | |
| 2006/0098649 A1 * | 5/2006 | Shay ........................ | 370/389 |
| 2006/0137002 A1 | 6/2006 | Forrester | |
| 2006/0227758 A1 * | 10/2006 | Rana et al. ................ | 370/351 |
| 2006/0233100 A1 | 10/2006 | Luft et al. | |

(Continued)

FOREIGN PATENT DOCUMENTS

FR  2868230  9/2005

(Continued)

OTHER PUBLICATIONS

Cisco SCE Service Control Engine, Cisco Systems, Inc. 2008, 2 pages.

(Continued)

*Primary Examiner* — Kwang B Yao
*Assistant Examiner* — Syed M Bokhari
(74) *Attorney, Agent, or Firm* — Van Pelt, Yi & James LLP (57) ABSTRACT

Methods and apparatuses are described for inspecting data packets in a computer network. One or more data packets through the network have associated header data and content. One method includes receiving a data packet, examining the data packet to classify the data packet including classifying the data packet using information included in the header and content, determining flow instructions for processing the packet based on both the header information and the content and processing of the packet using the flow instructions.

17 Claims, 7 Drawing Sheets

U.S. PATENT DOCUMENTS

| | | | |
|---|---|---|---|
| 2007/0011734 A1 | 1/2007 | Balakrishnan et al. | |
| 2007/0056038 A1* | 3/2007 | Lok | 726/23 |
| 2007/0121615 A1* | 5/2007 | Weill et al. | 370/389 |
| 2007/0289010 A1 | 12/2007 | Thomas et al. | |
| 2007/0297333 A1 | 12/2007 | Zuk et al. | |
| 2008/0186897 A1* | 8/2008 | Rune et al. | 370/315 |
| 2008/0253366 A1 | 10/2008 | Zuk et al. | |
| 2009/0213858 A1 | 8/2009 | Dolganow et al. | |

FOREIGN PATENT DOCUMENTS

| | | |
|---|---|---|
| JP | 2004-356983 | 12/2004 |
| JP | 2005-229573 | 8/2005 |
| JP | 2008-011537 | 1/2008 |
| WO | WO 2007/120165 | 10/2007 |
| WO | WO 2008/002930 | 1/2008 |
| WO | WO 2008/128085 | 10/2008 |

OTHER PUBLICATIONS

Optimizing Application Traffic with Cisco Service Control Technology, Cisco Systems, Inc. 2008, 7 pages.

Policy-Based Routing, Cisco Systems, Inc. 1996, 7 pages.

European Search Report for EP Application No. 07012529.9, dated Nov. 7, 2007.

International Search Report and Written Opinion for PCT Application No. PCT/US2008/60089, dated Jul. 23, 2008.

Roesch, M., "Snort—Lightweight Instruction Detection for Networks," Proceedings of LISA '99: 13th Systems Administration Conference, Nov. 7-12, 1999, pp. 229-238.

Examination Report in EP Application No. 07 012 529.9, dated Sep. 8, 2009.

Notice of Reasons for Rejection in Japanese Patent Application No. 2007-168277, dated Dec. 15, 2009.

Attig, M., and Lockwood, J. (2005). A Framework for Rule Processing in Reconfigurable Network Systems. Proceedings of the 13$^{th}$ Annual IEEE Symposium on Field-Programmable Custom Computing Machines (FCCM '05).

International Preliminary Report on Patentability in Application No. PCT/US2008/060089, dated Oct. 13, 2009.

* cited by examiner

PACKET CLASSIFICATION IN A NETWORK SECURITY DEVICE

BACKGROUND

The present invention relates to methods and apparatus for controlling computer network security.

A packet filter can operate on the data in the network layer, to defend a trusted network from attack by an untrusted network. Packet filters can operate at the network layer to inspect fields of the TCP/IP header including, the protocol type, the source and destination IP address, and the source and destination port numbers (i.e., a five tuple classification). Disadvantages of packet filters include low level of security and poor management in large networks with complex security policies. Packet filters alone may not provide robust protection because packet filters are not aware of the context of the given communication. That is, when classifying a packet, packet filters are not concerned with the information contained within a given packet or message that a series of packets forms. In addition, packet filters do not inspect the data at the application layer making packet filters vulnerable to attempted security intrusions using the application layer.

Figure 1A:
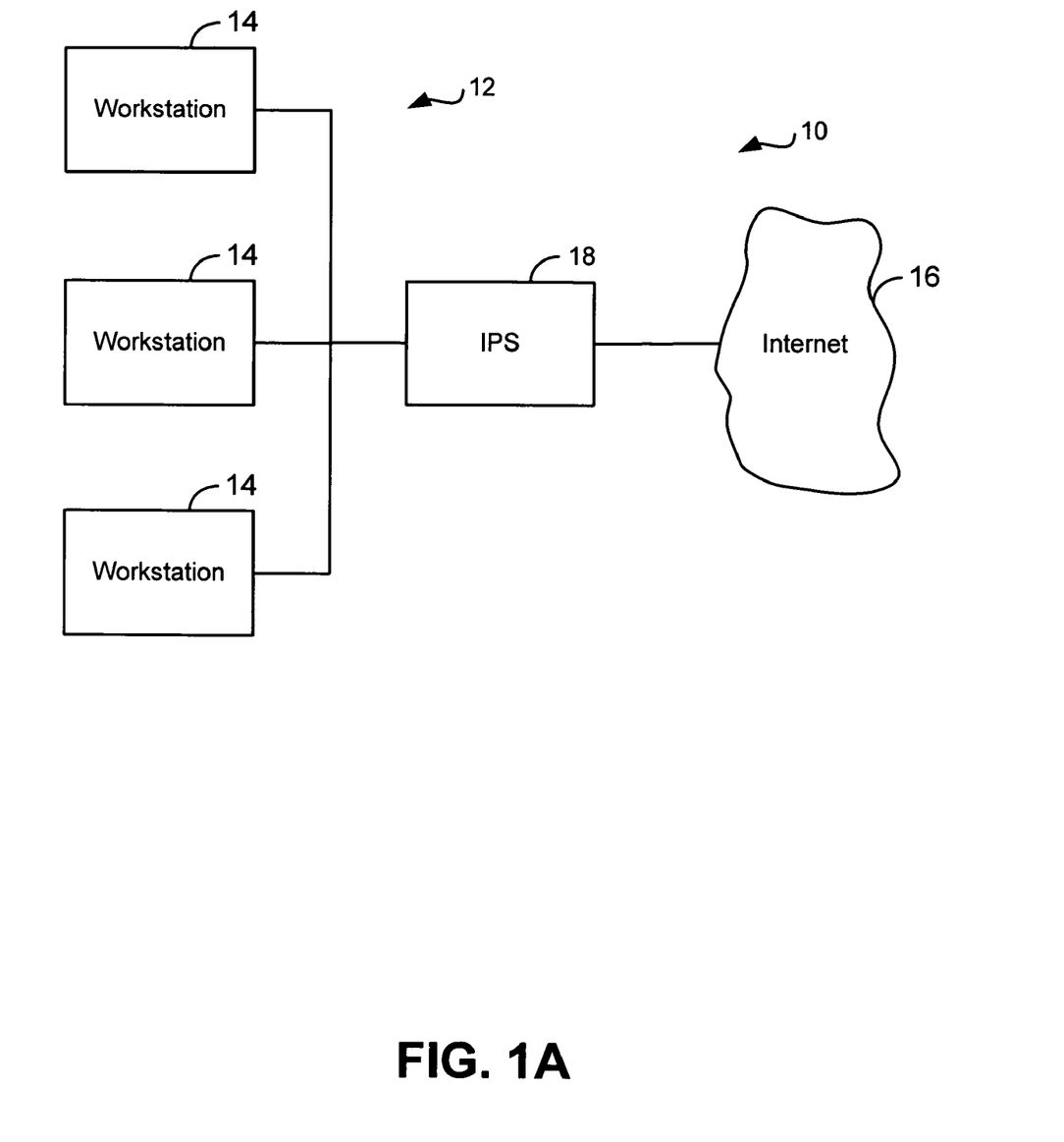
FIG. 1a shows a block diagram of a network topology that includes an IPS.

Firewalls and intrusion detection systems are devices that are used to protect a computer network from unauthorized, malicious or disruptive users. A firewall can be used to secure a local area network from users outside the local area network. A firewall checks, routes, and can label messages sent to or from users outside the local area network. An intrusion detection system (IDS) can be used to examine information being communicated within a network to recognize suspicious patterns of behavior. Information obtained by the IDS can be used to block unauthorized or disruptive users from accessing the network. An intrusion prevention system (IPS) is an in-line version of an IDS. An IPS can be used to examine information as it is being communicated within a network to recognize suspicious patterns of behavior. A conventional network topology that includes an IPS is shown in FIG. 1a. The network 10 includes a local area network 12 coupling one or more end user work stations 14. The local area network 12 is coupled to a wide area network 16, such as the Internet. Coupled between the local area network 12 and the wide area network 16 can be an IPS 18.

Figure 1B:
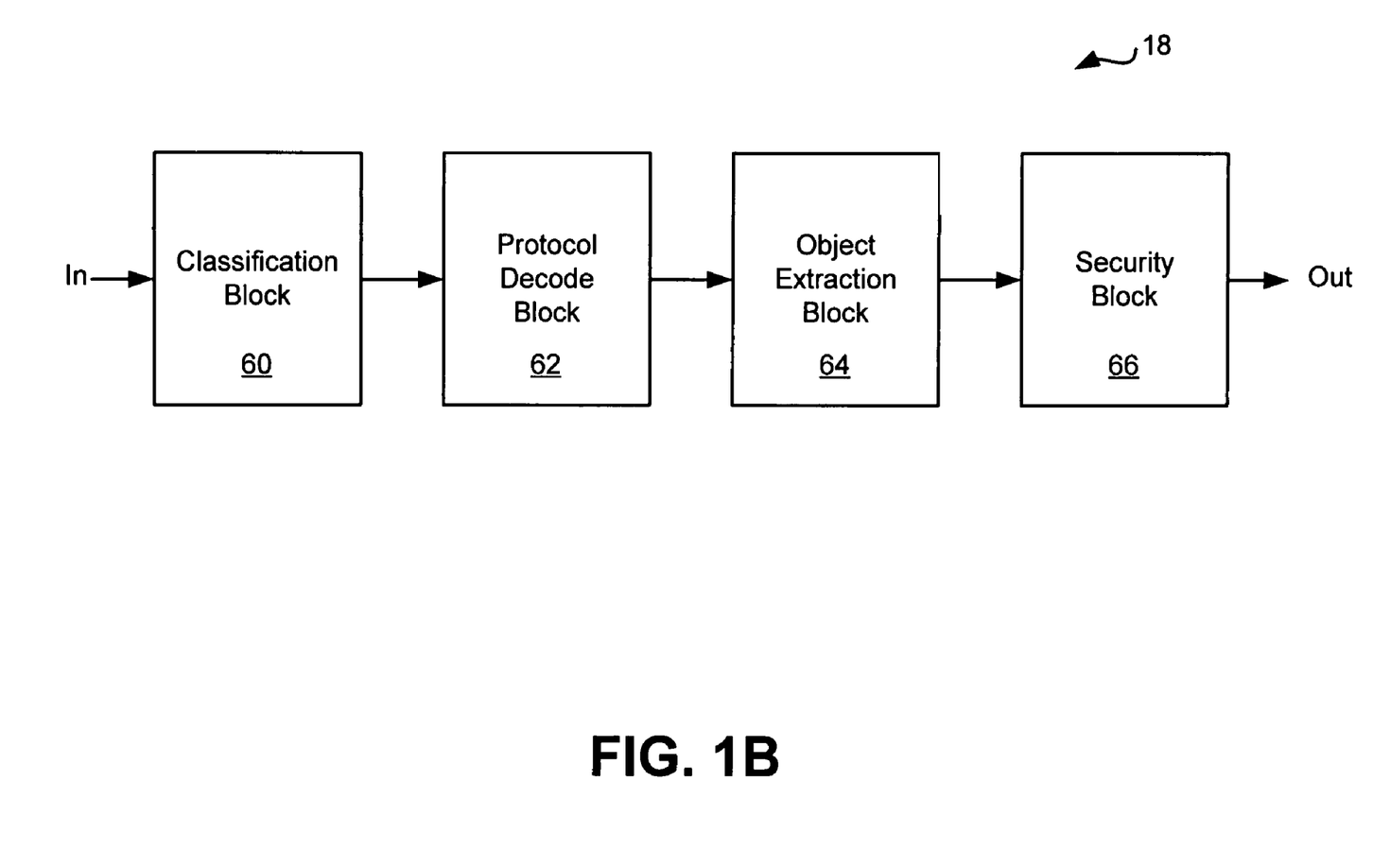
FIG. 1b illustrates a block diagram of a conventional IPS.

A conventional IPS can have the architecture shown in FIG. 1b and include a series of functional elements. Packets are received at classification block and are processed in line through the sequence of blocks until a decision is made to allow the packet to pass or be otherwise processed (e.g., dropped). Conventional IPS 18 includes a classification block 60, a protocol decode block 62, an object extraction block 64 and a security block 66.

Classification block 60 is used to classify the packets as they arrive based on header information contained within a given packet. Typically, classification block 60 classifies packets in a manner similar to a packet filter, using the protocol type, the source and destination IP address, and the source and destination port numbers. The classification data associated with a given packet can be quickly evaluated and matched to one or more rules in a rule set. Classification block 60 can include a classification data structure that is indexed based on the classification data and includes matching rules for processing a given packet. Based on the classification, further processing of a given packet can result including passing or dropping the packet. Further processing as well can include further processing in other blocks of the IPS. The rules can include designators for special processing in one or more later blocks in the IPS, such as the security block 66.

Protocol decode block 62 can be used to decode protocol information included in the packet. The protocol information can be used to determine special handling for a packet, beyond the classification.

Object extraction block 64 can be used to buffer, construct and extract objects from the packets for special processing. For example, objects that are attached to a file in a conventional email system can be extracted for special processing (e.g., zip messages, executable files (.exe files) etc.).

Security block 66 is the final block in the IPS 18 and includes the unique security algorithms for matching. The unique security algorithms can be of the form of signatures that the IPS uses to match as against packets to detect applications at the application layer. Problematically, at this point in the IPS 18, the only processing choice for a conventional IPS 18 in the event a match is detected is to drop a given packet. No further rule checking or other special processing can be performed, for example based on the application that is detected.

SUMMARY

The present invention provides methods and apparatus, including computer program products, for classifying data packets and for implementing computer network security.

In one aspect a method includes receiving a data packet, examining the data packet to classify the data packet including classifying the data packet using information included in the header and content, determining flow instructions for processing the packet based on both the header information and the content and processing of the packet using the flow instructions.

Aspects of the invention can include one or more of the following features. Examining the data packet can include classifying the packet based on the content. Processing the packet can include content based protocol decoding, content based object extraction or content based pattern matching. Processing the packet can be selected from the group consisting of logging, storing, allowing the packet to pass, setting an alarm, blocking, or dropping the packet.

In another aspect, a method is provided for inspecting data packets in a computer network. One or more data packets can have associated header data and content. The method can include receiving the data packet, examining the data packet to classify the data packet including classifying the data packet using information included in a header portion of the data packet and separately classifying the data packet based on a content portion of the data packet, and determining flow instructions for processing the data packet based on the header information. The method can further include determining special processing instructions for processing the data packet based on the content portion, determining selected instructions from among the flow and special processing instructions for processing the data packet and processing the data packet in accordance with the selected instructions.

Aspects of the invention can include one or more of the following features. The special processing instructions can include instructions to perform content based protocol decoding, content based object extraction, or content based pattern matching.

In another aspect, a device is provided that includes a multi-mode classification engine for classifying received data packets. The multi-mode classification engine includes a header classification engine for classifying data packets in accordance with header data associated therewith, the header classification engine generating first classification data and a content classification engine for classifying data packets in accordance with content of the data packets, the content classification engine generating second classification data. The device further includes a security block for evaluating the data packets including evaluating the data packets using one or both of the first and the second classification data.

Aspects of the invention can include one or more of the following features. A protocol block can be included that is operable to receive the second classification data from the multi-mode classification engine and provide content based protocol decoding of received data packets. An object extraction block can be included that is operable to receive the second classification data from the multi-mode classification engine and provide content based object extraction of received data packets.

The multi-mode classification engine can further include a session manager for determining session data associated with the data packets, rules indexed by the second classification data, a signature matching engine and a signature database for use by the signature matching engine that includes one or more patterns.

Advantages of the invention may include one or more of the following features. The technique disclosed can be used to detect an attempted network security intrusion and potentially block the current packet associated with the security intrusion. The disclosed technique can provide robust and efficient network security and includes classification that is not limited to merely header information that is included in a given packet. Classification of packets can include both classical header processing as well as signature scanning. Matching of either header data or signatures can result in rule based processing of the packet data. As more information is discovered in the packet processing, the classification can be updated to reflect the additional data.

The details of one or more implementations of the invention are set forth in the accompanying drawings and the description below. Other features and advantages of the invention will become apparent from the description, the drawings, and the claims.

DESCRIPTION OF DRAWINGS

Like reference numbers and designations in the various drawings indicate like elements.

DETAILED DESCRIPTION

Figure 2A:
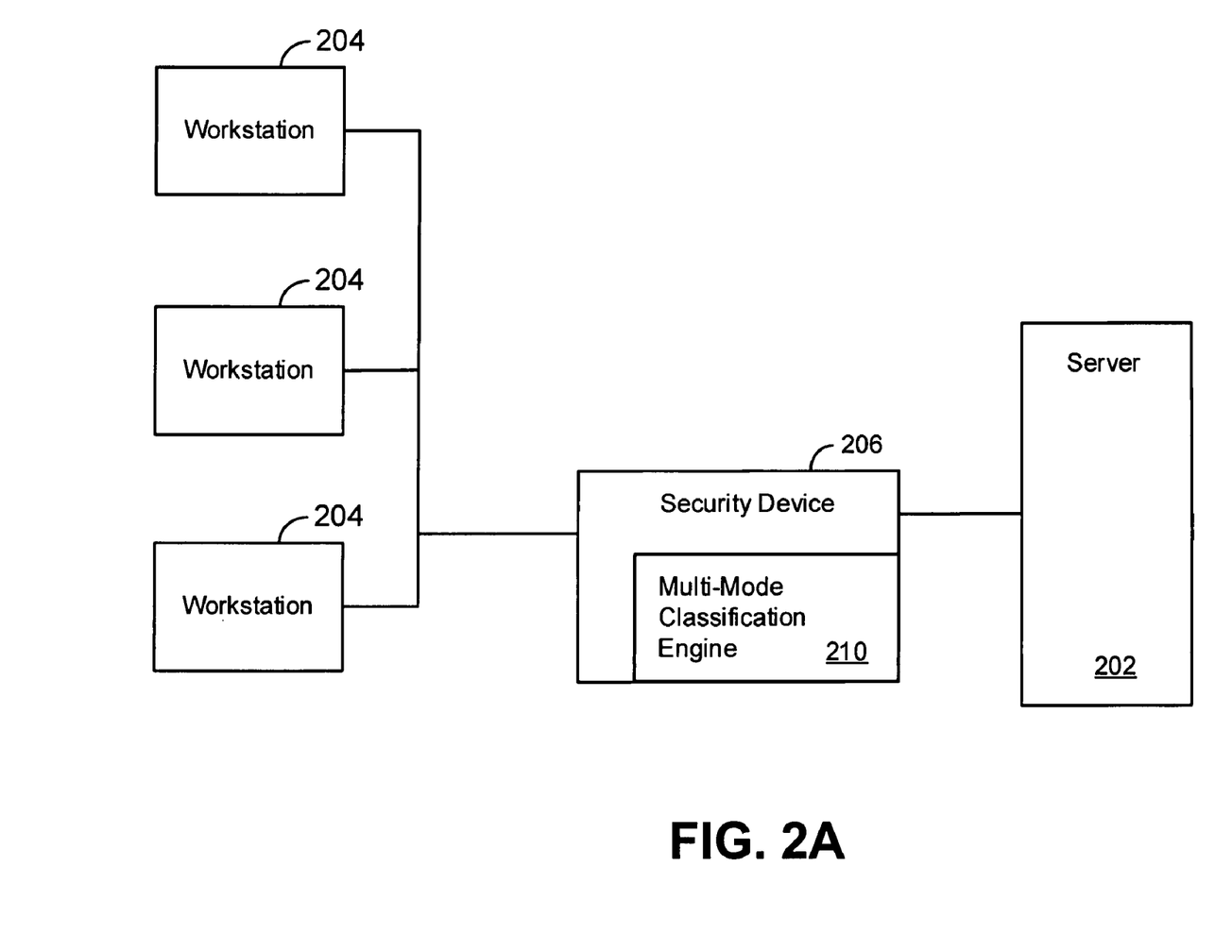
FIG. 2a shows a block diagram of a network topology including a multi-mode classification IPS.

FIG. 2a shows a simple network topology including a local area network (LAN) 200, a server 202, several workstations (W/S) 204, and a security device 206. The network topology is merely representative of one implementation for the use of security device 206. Other network topologies are possible including those that include more than one network, wide area network(s), local area networks or combinations of both with or without distributed topologies (e.g., topologies other than client-server topologies). The security device 206 includes a multi-mode classification engine 210 and other operational elements for processing packets received as will be discussed in greater detail below.

The computer workstations, servers and other devices in the LAN are interconnected using a number of data transmission media such as wire, fiber optics, and radio waves. The security device 206 monitors packets being communicated within the network to facilitate the blocking of packets associated with an attempted network security intrusion.

Figure 2B:
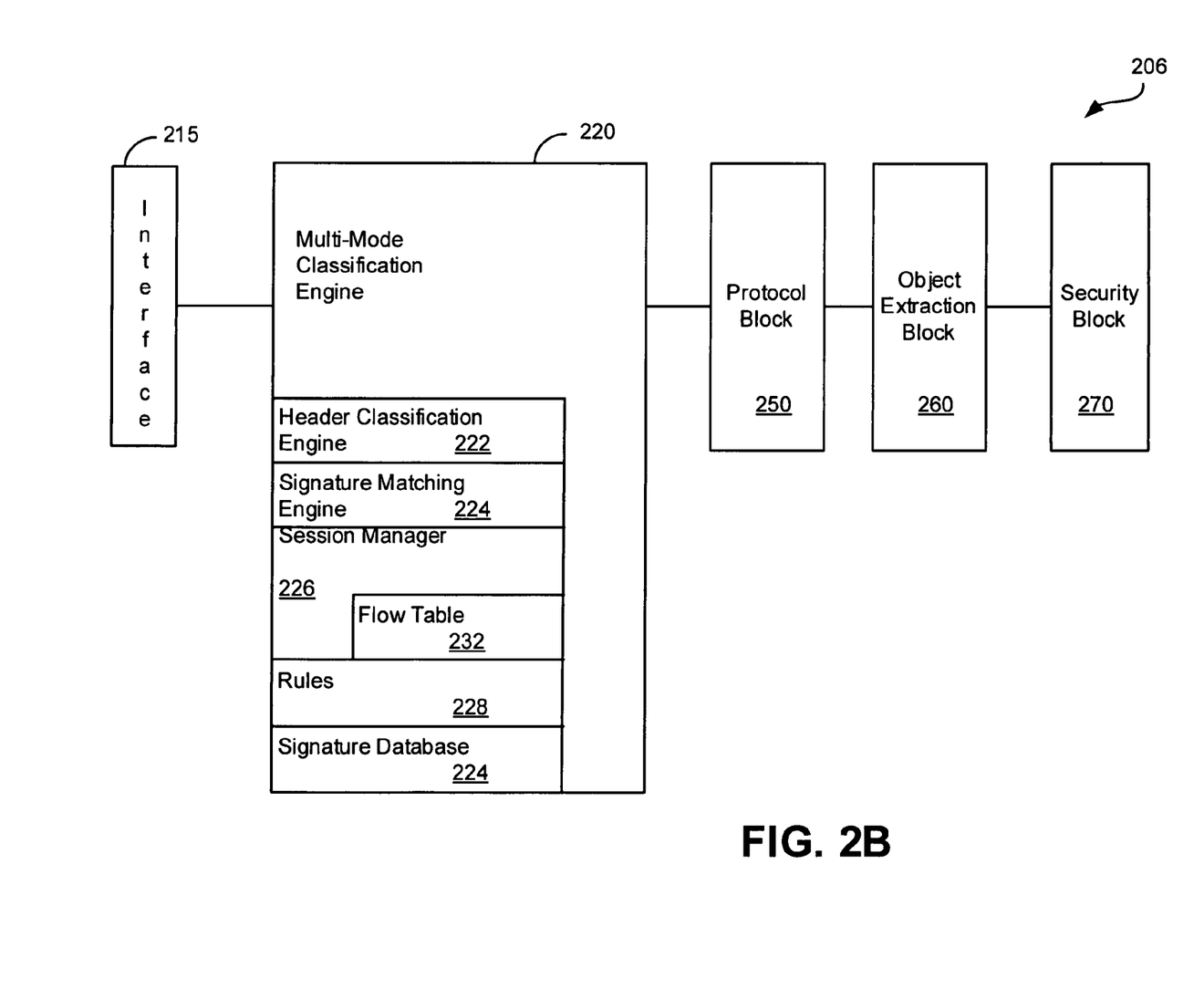
FIG. 2b shows a block diagram of network security device including a multi-mode classification engine.

FIG. 2b shows a block diagram of security device 206. In one implementation, security device 206 includes an incoming packet interface 215, multi-mode classification engine 220, protocol block 250, object extraction block 260 and security block 270.

Security device 206 includes an incoming packet interface 215 for receiving packets. The received packets are analyzed by a multi-mode classification engine 220 to assist in the determination of whether an attempted network security intrusion is in progress. The multi-mode classification engine 220 includes plural modes for classifying incoming packets that are updated as more packets are received. Multi-mode classification engine 220 includes a header classification engine 222, signature matching engine 224, and optionally a session engine 226.

Header classification engine 222 uses information located in a header of a received packet to classify packets for further processing. Based on the classification, one or more rules in an associated rule base 228 may be evaluated and further processing initiated. Further processing can include specialized signature matching in for example security block 270.

Signature matching engine 224 can be used to classify packets for further processing based on signatures detected, for example at the application level. Signature matching engine 224 can include a signature database 230 that is typically local, though can be distributed including portions remote from the security device 206. Signature matching can include fixed pattern matching, regular expression matching, and specialized matching performed by, for example, specialized software to detect complex application-behavior patterns or a combination of the above. Matches detected by signature matching engine can be used to classify the received packet(s) for further processing including identifying rules in rule base 228 to be used in processing the packet(s).

Rule base 228 can include policy information (firewall policy, IPS policy etc., to apply to the classified packets) as well as other information that is used by the other modules in the security device 206 such as encryption parameters, address translation parameters, bookkeeping information, and statistics. The rule base 228 can also include information required by the multi-mode classification engine 220 in order to decide whether the packet should be allowed. Such information can include information required to implement network policies regarding, for example connection time out, time billing, and bandwidth usage.

The session engine 226 also includes a flow table 232. The flow table 232 is used to store information regarding flows associated with received packets. Associated with a flow can be one or more rules stored or indicated in the flow table 232. The rules can be used to further process packets associated with a given flow.

Figure 2C:
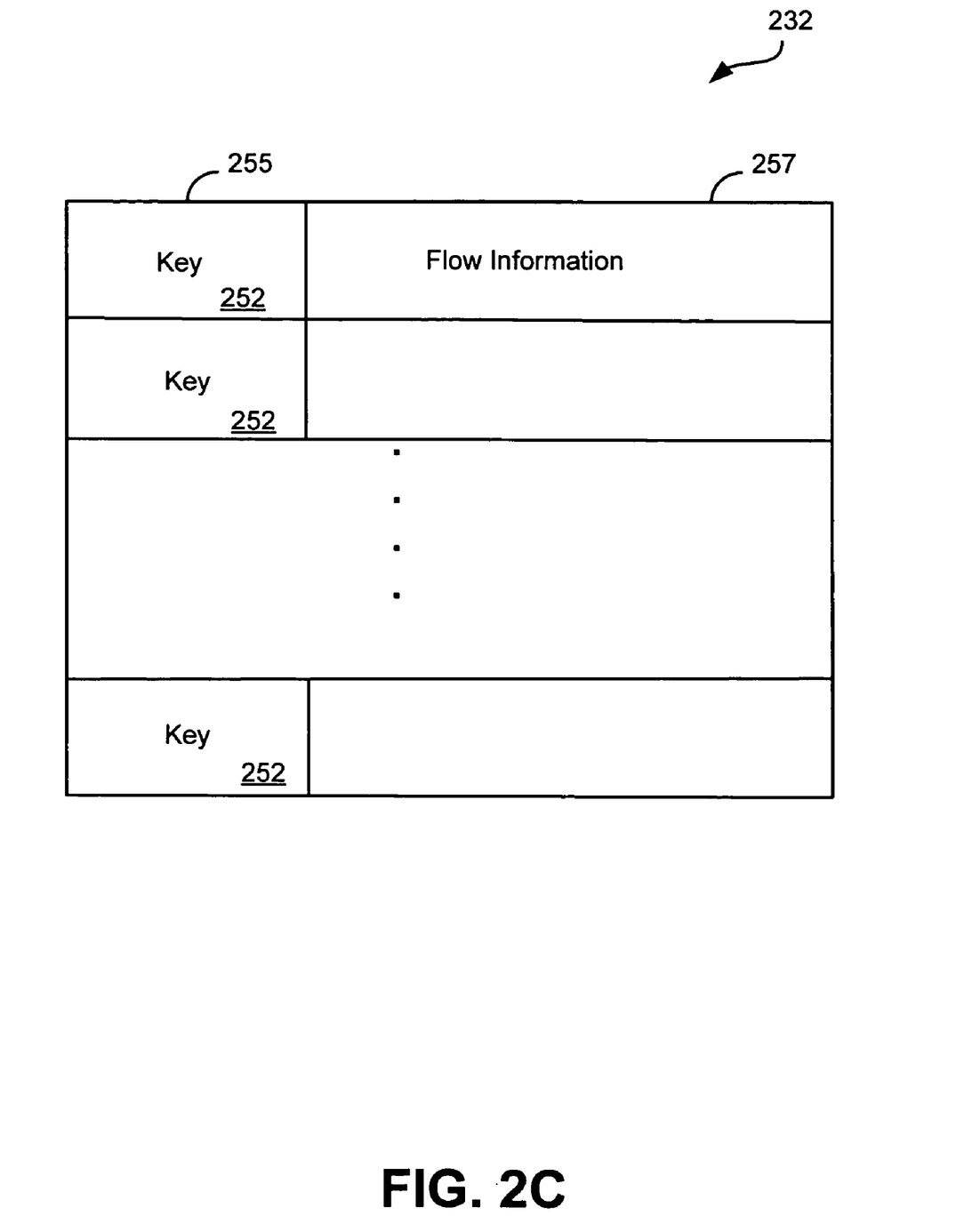
FIG. 2c shows a flow table.

FIG. 2c illustrates a structure of a flow table 232. The flow table 232 includes flow records 252 associated with current TCP/IP flows. A TCP/IP flow includes a sequence of data packets communicating information between a source and a destination in one direction. The flow records 252 are indexed using an indexing key 255. The indexing key 255 is used to store and retrieve the appropriate flow record associated with a received packet. In one implementation, the indexing key 255 can be a hash key and the flow table 232 can be implemented as a hash table. The flow table 232 stores instructions that can be used by one or more modules in the security device 206 to further process received packets. The flow record 252 can include flow information 257. Flow information 257 can be of the form of policy information (firewall policy, IPS policy etc., to apply to the flow) as well as other information that is used by the other modules in the security device 206 such as encryption parameters, address translation parameters, bookkeeping information, and statistics. The flow information 257 can also include information required by the session engine 226 in order to decide whether the packet should be allowed. Such information can include information required to implement network policies regarding, for example connection time out, time billing, and bandwidth usage.

Protocol block 250 can be used to decode protocol information included in the packet. The protocol information can be used to identify which security processing is needed for each part of the traffic. In one implementation, multi-mode classification engine 220 can provide classification information to protocol block 250. The classification information can be used to determine which protocol or protocols the protocol decoding engine in block 250 should decode the traffic as. Protocol block 250 can provide content based protocol decoding based on the classification information thus providing specialized protocol decoding that is unique to the detected content.

For example, the multi-mode classification engine 220 may use header matching combined with matching a set of regular expressions to classify a group of two flows as a Microsoft Instant Messenger (IM) TCP connection. The protocol decoder can then use the classification information to determine that these two flows need to be decoded as a Microsoft IM session and can determine, among many other things, situations where the Microsoft IM is being used to transfer executable files. This information will be used later by the object extraction block 260 to determine where in the traffic is the file to be extracted.

Yet another example may be a File Transfer Protocol (FTP) connection on a non-standard port. Usually, FTP connections use their designated port (e.g., port 21). However, one might try to bypass traditional classifiers by running FTP on a non-standard port, for example port 80 which is usually used for Hypertext Transfer Protocol (HTTP). In this case, the multi-mode classification engine 220 will detect the FTP traffic on port 80 using a combination of regular expression and/or fixed pattern signatures and will inform the protocol block 250 to decode the traffic as FTP. This will allow the protocol decoder in the protocol block 250 to determine, among many other things, where the files are in the traffic and inform the object extraction block 260 and a security block 270 about the presence of a file.

Object extraction block 260 can be used to buffer, construct and extract objects from the packets for special processing. For example, objects that are attached to a file in a conventional email system can be extracted for special processing (e.g., zip messages, executable files (.exe files) etc.) or files that are transferred by a file transfer, instant messenger or peer-to-peer protocol. In one implementation, multi-mode classification engine 220 can provide classification information to object extraction block 260. The classification information can be used in the object extraction process. Object extraction block 260 can provide content based extraction based on the classification information thus providing specialized extraction that is unique to the detected content.

Security block 270 is the final block in the security device 206 and includes the unique security algorithms for matching. In one implementation, multi-mode classification engine 220 can classify a packet based on content, for example as being associated with a particular application. Based on this classification, security block 270 can provide specialized signature matching (e.g., content based pattern matching) for packets associated with the content, e.g., the application.

For example, an HTML file can be transmitted over the network 200 as a series of packets. The packets can be transported on, for example, port 80. The HTML file can include an instant message (IM). Multi-mode classification engine 270 can determine that the IM is included in the packet stream and instruct the security block 270 to particularly screen for signatures associated with an IM. In another example, an MSN messenger message is transmitted as a series of packets. The message may include a virus. The series of packets includes a first packet which is received on port X (e.g., 3000), and initially is classified by the multi-mode classification engine 220 as unknown. Packets can be buffered or in one implementation described below, packets can be copied and stored for further processing (as discussed below) in the multi-mode classification engine 220. After a sequence of packets is received, the multi-mode classification engine detects, using the signature matching engine 224 that an MSN message is associated with the series of packets. The multi-mode classification engine 220 can provide the classification information to the security block 270. The security block 270 can thereafter apply specialized packet processing for MSN messages to, for example, detect the presence of viruses. The classification based on content in the multi-mode classification engine 220 allows for the application of unique security algorithms to be applied to the content in the security block 270. In this example, a signature match in the security block 270 can be used to detect and disallow a virus in the MSN message to pass into the system. However, other MSN messages without viruses would be allowed to pass. This is in contrast to conventional IPS systems.

Security block 270 can include on or more unique security algorithms. The unique security algorithms can be of the form of signatures that the security device 206 uses to match as against packets to detect malicious or unwanted content. Accordingly, security device 206 can include two distinct policies, one for access control implemented at the multi-mode classification engine 220 and one for attack mitigation implemented at the security block 270.

Figure 3:
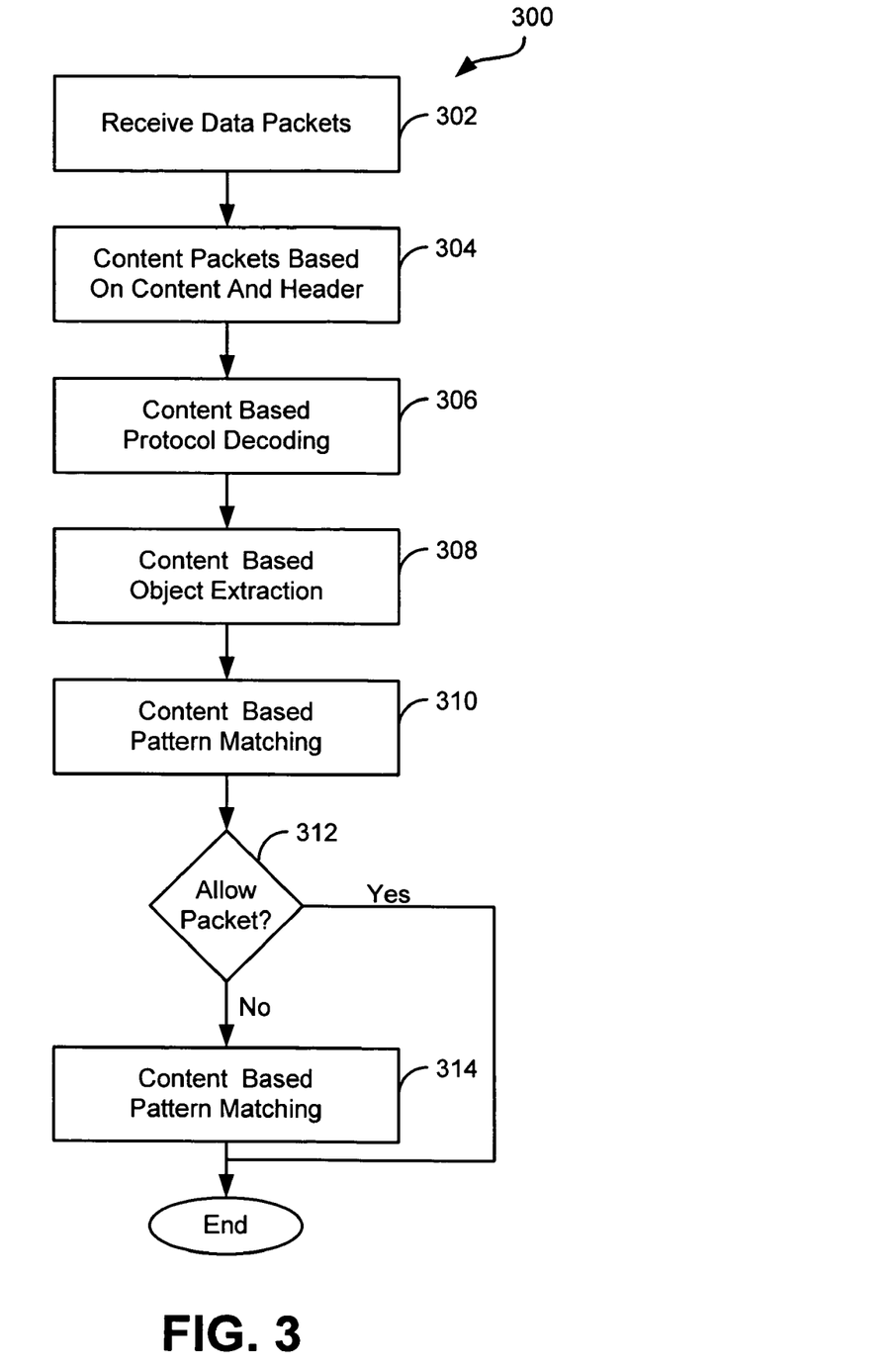
FIG. 3 is a flowchart describing the operation of the multi-mode classification engine.

FIG. 3 is a flow diagram describing the operation 300 of the security device 206. Referring now to FIGS. 2b and 3, incoming packets are received by, for example the packet interface 215 (step 302). Packets can be initially processed (e.g., defragmented and headers validated) as required. The packets are classified in accordance with both content and header information, by for example the multi-mode classification engine 220 (step 304). Based on the classification, specialized processing can be performed including one or more of content based protocol decoding (step 306), content based object extraction (step 308) and content based pattern matching (step 310). A determination can be made if the packet should be allowed based on information obtained regarding the header (including flow information developed for example in session manager 226), the content or the specialized processing (step 312). Otherwise, the packet is otherwise processed at step 314. Other processing can include logging particular information regarding the packet, holding the packet, modifying the packet, dropping the packet or banning the entire flow.

Figure 4:
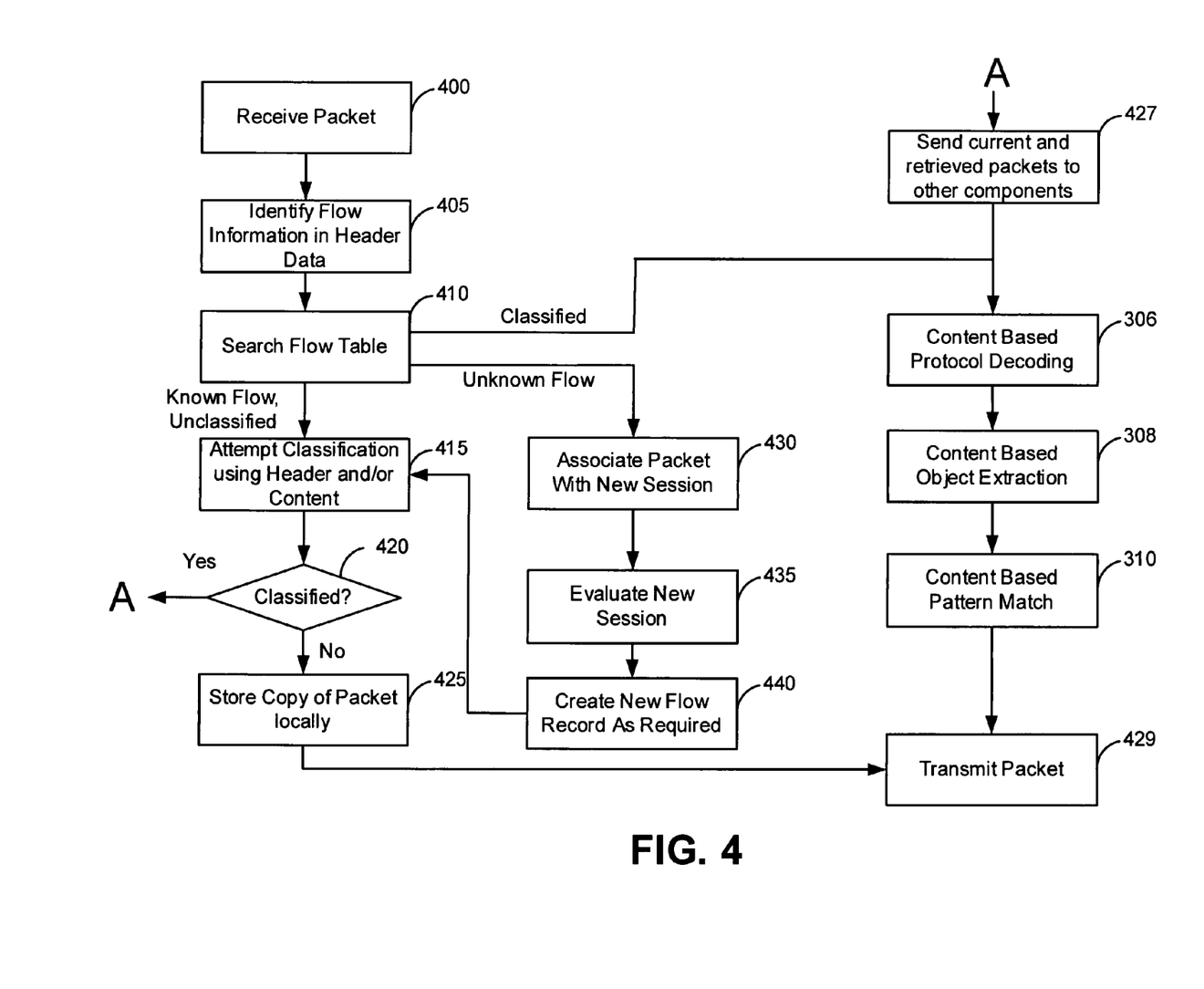
FIG. 4 is flowchart describing the classification process.

FIG. 4 is a flow diagram showing the steps included in packet classification (step 304) and attending steps associated with protocol decoding (step 306), content based extraction (step 308) and content based pattern matching (step 310) described above in relation to FIG. 3. Classification begins with the receipt of a packet (step 400), and extraction of information (step 405) (e.g., flow information in the header) required to determine how the packet should be processed (look-up step 410) in one of three paths.

In a first path, the packet is associated with a flow that has been previously classified (e.g., it's a known flow and it has been classified by the multi-mode classification engine 220). For classified flows, no further classification is required. The packet processing can continue at step 306 including content based protocol decoding (by for example, protocol block 250). Thereafter, content based extraction (step 308) and content based pattern matching (step 310) can be performed.

In a second path, characterized in that the packet is associated with a known flow but one not yet classified, the an attempt is made to classify the packet (and attending flow) based on the header data or content (step 415). Attempted classification can include retrieving previously stored packets (see step 425 below) associated with the same flow and the evaluation of both the current packet and these previous packets (e.g., in content based classification). Just as with a conventional system, for a known session flow, a matching flow record in a flow table can be retrieved and include information for processing the packet. Based on the flow information, a determination can be made if the received packet should be allowed. The determination can be made based on policy information that is associated with the classification process (e.g., policy information that is used by the multi-mode classification engine 220) or other information that is developed by the security device (e.g., protocol information, object information, or pattern matches developed by other blocks of the security device). Returning to the classification process, if the attempt to classify the packet is successful (step 420), then the process will send (step 427) the previously stored packets and the current packet to the decoder to allow for decoding at step 306. Else, a copy of the packet is stored (step 425) locally (e.g., for use in further classification steps) and the packet is transmitted (step 429). Transmission can include the transfer of the packet out of the system (e.g., out of the security device).

In the third path, characterized with an unknown flow (e.g., a matching flow record is not found in the flow table using the information extracted in step 405), the received packet can be associated with a new session (step 430). For a new session, a session ID can be assigned. The new session can be evaluated in order to determine if received packets associated with the new session should be allowed (for example using the extracted header information and policies associated with multi-mode classification engine 220) (step 435). If allowed, a new flow record can be created and stored in the flow table (step 440). The new flow record includes the flow (e.g., TCP/IP session) information for the new session associated with the received packet and any other specific security device information. Thereafter, an attempt can be made to classify the new flow as the process continues at step 415.

Based on the classification provided above in step 415, specialized processing can be performed including content based protocol decoding, content based object extraction and content based pattern matching. Based on the content based processing, information can be identified (e.g., policies and the like) for processing the received packet. A determination to allow the data packet can be made based on policy information that is associated with the classification process (e.g., policy information that is used by the multi-mode classification engine 220) or other information that is developed by the security device (e.g., content based protocol information, object information, or pattern matches developed by other blocks of the security device). Depending on the returned results from the various operators, the packet can be forwarded, dropped, logged, stored, modified or otherwise processed.

The security device 206 can be used in a number of different network topologies. For example, the security device can be integrated into a firewall. Alternatively, the security device 206 can be operated in series with a firewall and a router.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network.

Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

This invention has been described in terms of particular embodiments. Nevertheless, it will be understood that various modifications may be made without departing with the spirit and scope of the invention. For instance, the steps of the invention can be performed in a different order and still achieve desirable results. Accordingly, other embodiments are within the scope of the following claims.

What is claimed is:

1. A method comprising: receiving, by a processor, a data packet; examining the data packet to initially classify the data packet including initially classifying the data packet using information included in an header and content; determining flow instructions for processing the data packet based on both the header and the content including determining, using at least one of the header or the content, whether the data packet is associated with a data flow that has previously been classified; if the data flow has previously been classified, performing at least one of content based protocol decoding, content based object extraction, or content based pattern matching; if the data flow has not previously been classified, processing the data packet based on whether the data flow is a known data flow; updating the initial classification based on a processing result of one or more of the content based protocol decoding, content based object extraction, or content based pattern matching; and using the updated classification to determine whether a next data flow has previously been classified.

2. The method of claim 1 where examining the data packet includes classifying the data packet based on the content.

3. The method of claim 1 where performing includes performing at least two of the content based protocol decoding, content based object extraction, and content based pattern matching.

4. The method of claim 1 where performing includes performing content based protocol decoding, content based object extraction, and content based pattern matching.

5. The method of claim 1 further comprising performing, based on a result of the content based protocol decoding, content based object extraction or content based pattern matching, an action selected from a group comprising logging, storing, allowing the packet to pass, setting an alarm, blocking, or dropping the packet.

6. The method of claim 1, where processing the data packet based on whether the data flow is a known data flow includes:
   determining the data flow is known but has not previously been classified;
   retrieving one or more previously received data packets associated with the data flow;
   processing the data packet and the one or more previously received data packets associated with the data flow including performing at least one of the content based protocol decoding, the content based object extraction or the content based pattern matching on the data packet and the one or more previously received data packets.

7. The method of claim 1, where processing the data packet based on whether the data flow is a known data flow includes:
   determining the data flow is unknown and has not previously been classified;
   associating a new session with the data packet;
   generating a new flow record associated with the data packet, the new flow record including information for the new session associated with the data packet; and
   processing the data packet based on the new flow record including performing at least one of the content based protocol decoding, the content based object extraction or the content based pattern matching on the data packet.

8. A method comprising: receiving, by a processor, a data packet; examining the data packet to initially classify the data packet including initially classifying the data packet using information included in a header portion of the data packet and separately initially classifying the data packet based on a content portion of the data packet where initially separately classifying the data packet based on the content includes determining an application associated with the packet; determining flow instructions for processing the data packet based on the information in the header portion; determining special processing instructions for processing the data packet based on the content portion and the application; determining selected instructions from among the flow and special processing instructions for processing the data packet including determining, using the selected instructions, whether the data packet is associated with a data flow that has previously been classified; if the data flow has previously been classified, performing at least one of content based protocol decoding, content based object extraction, or content based pattern matching; and if the data flow has not previously been classified, processing the data packet based on whether the data flow is a known data flow; where the special processing instructions include instructions to update the initial classification based on a processing result of one or more of the content based protocol decoding, content based object extraction, or content based pattern matching, and additional instructions to use the updated classification to determine whether the data flow has previously been classified.

9. The method of claim 8 where the special processing instructions include instructions to perform at least two of the content based object extraction, content based pattern matching, or content based protocol decoding based on the application.

10. The method of claim 8 where the special processing instructions include instructions to perform content based protocol decoding, content based object extraction, and content based pattern matching based on the application.

11. The method of claim 8 further comprising performing, based on a result of the content based protocol decoding, content based object extraction or content based pattern matching, an action selected from a group comprising logging, storing, allowing the packet to pass, setting an alarm, blocking, or dropping the data packet.

12. A device comprising: a multi-mode classification engine for classifying received data packets, the multi-mode classification engine including: a header classification engine for classifying data packets in accordance with header data associated with the data packets, the header classification engine generating first classification data; and a content classification engine for initially classifying data packets in accordance with content of the data packets, the content classification engine generating second classification data including data about which application is associated with the data packets, the content classification engine is further configured to: determine, using at least one of the header data or the content, whether the received data packets are associated with a data flow that has previously been classified; and a security block for evaluating the data packets including evaluating the data packets using both of the first and the second classification data including the application data, the security block is further configured to: perform content based pattern matching on the received data packets if the data flow has previously been classified; and process the received data packets based on whether the data flow is a known data flow if the data flow has not previously been classified; where the content classification engine is further operable to update the second classification data based on a processing result of one or more of content based protocol decoding, content based object extraction or content based pattern matching; and where the security block is operable to evaluate the received data packets based on the updated second classification data.

13. The device of claim 12 further comprising
a protocol block operable to receive the second classification data from the multi-mode classification engine and provide content based protocol decoding of received data packets based on the application.

14. The device of claim 12 further comprising an object extraction block operable to receive the second classification data from the multi-mode classification engine and provide content based object extraction of received data packets based on the application.

15. The device of claim 12 where the multi-mode classification engine further comprises a session manager for determining session data associated with the data packets.

16. The device of claim 12 where the multi-mode classification engine further comprises rules indexed by the second classification data and based on the application.

17. The device of claim 12 where the content classification engine includes a signature matching engine and a signature database for use by the signature matching engine that includes one or more patterns.

* * * * *

UNITED STATES PATENT AND TRADEMARK OFFICE
CERTIFICATE OF CORRECTION

PATENT NO. : 8,009,566 B2
APPLICATION NO. : 11/475393
DATED : August 30, 2011
INVENTOR(S) : Zuk et al.

It is certified that error appears in the above-identified patent and that said Letters Patent is hereby corrected as shown below:

In the Drawings:

Figs. 2A and 2B should be deleted and substitute therefor the attached figure(s) 2A-2B as shown on pages 2 and 3, Sheets 3-4 of 7

In the Specification:

Column 1, Line 46:
Insert --a-- before classification

Column 2, Line 13:
Delete "as" before against

Column 3, Line 47:
Insert --a-- before network

Column 3, Line 52:
Insert --a-- before flowchart

Signed and Sealed this
Twenty-fifth Day of March, 2014

Michelle K. Lee
*Deputy Director of the United States Patent and Trademark Office*

FIG. 2A

FIG. 2B